United States Patent
Shin et al.

(10) Patent No.: US 7,452,433 B2
(45) Date of Patent: Nov. 18, 2008

(54) CUSHIONED FLOORING SYSTEM AND METHODS FOR MAKING AND INSTALLING THE SAME

(75) Inventors: Jin-Woong Shin, Copley, OH (US); Ron Felgenhauer, New Philadelphia, OH (US)

(73) Assignee: Lauren Agrisystems, Ltd., New Philadelphia, OH (US)

( * ) Notice: Subject to any disclaimer, the term of this patent is extended or adjusted under 35 U.S.C. 154(b) by 675 days.

(21) Appl. No.: 10/843,744

(22) Filed: May 12, 2004

(65) Prior Publication Data

US 2005/0086886 A1 Apr. 28, 2005

Related U.S. Application Data

(60) Provisional application No. 60/509,340, filed on Oct. 7, 2003, provisional application No. 60/470,111, filed on May 12, 2003.

(51) Int. Cl.
| | |
|---|---|
| *E04F 13/072* | (2006.01) |
| *E04F 13/075* | (2006.01) |
| *B29C 65/48* | (2006.01) |
| *B32B 37/00* | (2006.01) |
| *B32B 38/04* | (2006.01) |
| *B05D 3/12* | (2006.01) |

(52) U.S. Cl. .......................... 156/71; 156/257; 427/290
(58) Field of Classification Search ............... 156/71, 156/250, 257; 427/136, 289, 290; 52/403.1, 52/741.4, 741.41, 745.21, 746.1
See application file for complete search history.

(56) References Cited

U.S. PATENT DOCUMENTS

| | | | |
|---|---|---|---|
| 3,082,488 A * | 3/1963 | Nusbaum | 52/591.1 |
| 3,461,844 A | 8/1969 | Harrison | |
| 3,579,941 A | 5/1971 | Tibbals | |
| 4,233,793 A | 11/1980 | Omholt | |
| 4,424,255 A | 1/1984 | Nakamura et al. | |
| 4,819,932 A | 4/1989 | Trotter, Jr. | |
| 4,860,510 A | 8/1989 | Kotler | |
| 4,945,858 A | 8/1990 | Myers et al. | |
| 5,052,158 A | 10/1991 | D'Luzansky | |
| 5,724,916 A | 3/1998 | Brodie et al. | |
| 5,726,272 A | 3/1998 | Yonek | |
| 5,967,092 A | 10/1999 | Pederson | |
| 5,989,695 A | 11/1999 | Fuller et al. | |
| 6,152,077 A | 11/2000 | Bristow | |
| 6,395,362 B1 | 5/2002 | Pacione | |
| 6,623,840 B2 | 9/2003 | Hainbach | |
| 6,642,303 B2 | 11/2003 | Schutze et al. | |
| 6,689,239 B1 | 2/2004 | Grubic | |
| 2003/0091831 A1 * | 5/2003 | Mickey | 428/423.1 |

OTHER PUBLICATIONS

Polyurea.com website—2 pages—dated 2002.
Huntsman Polyurea Spray Catalog—12 pages—dated 2001.
SSPC: The Society for Protective Coatings Technology Update No. 8—The Use of Isocyanate-Containing Paints as Industrial Maintenance Coatings—7 pages—dated Feb. 1, 2001.

(Continued)

*Primary Examiner*—Philip C Tucker
*Assistant Examiner*—Sing P Chan
(74) *Attorney, Agent, or Firm*—Zollinger & Burlesoa Ltd.

(57) ABSTRACT

A flooring system includes a preformed cushion layer made up of a plurality of individual preformed cushioning body sections that are sandwiched between sealant layers to provide a liquid-impervious flooring material. Methods for manufacturing the body sections and installing the flooring system are also provided.

17 Claims, 10 Drawing Sheets

OTHER PUBLICATIONS

The Sherwin-Williams Company: Industrial & Marine Coating Systems @ www2.sherwin.com, Project Profiles, A New Base—2 pages—dated Spring 2003.

International Concrete Repair Institute, Guideline No. 03741, Guide for Design, Installation, and Maintenance of Protective Polymer Flooring Systems for Concrete, dated Feb. 2004, 43 pages.

Regupol Multipurpose Sports Flooring Catalog, 4 pages, document is undated but inventor believes the document is older than May 12, 2003.

Regupol Track & Field Surface System Catalog, 4 pages, document is undated but inventor believes the document is older than May 12, 2003.

* cited by examiner

CUSHIONED FLOORING SYSTEM AND METHODS FOR MAKING AND INSTALLING THE SAME

CROSS REFERENCE TO RELATED APPLICATION

This application claims priority from U.S. Provisional Patent application Ser. No. 60/509,340 filed Oct. 7, 2003, and U.S. Provisional Patent Application Ser. No. 60/470,111 filed May 12, 2003; the disclosures of both are incorporated herein by reference.

BACKGROUND OF THE INVENTION

1. Technical Field

The present invention generally relates to flooring systems and, more particularly, to flooring systems that have a seamless, liquid impervious upper layer. The invention also relates to the methods of making and installing the system. Specifically, the invention relates to a liquid-impervious, cushioned flooring system designed for use with dairy cows and the methods for making and installing the same.

2. Background Information

Concrete, metal, and wood floors are hard on the feet and legs of those who use the floors over many hours or days. Those of ordinary skill in the art recognize that floor mats can provide comfort for those who must work on such floors over long periods of time. Although most of these efforts have been to provide cushioned floor surfaces to humans, some in the art have directed their attention to providing cushioned flooring to livestock, zoo animals, and pets.

For example, a significant problem in the dairy industry is the health and productivity of the dairy cows. Lameness is a significant problem in the dairy industry. Most dairy cows spend hours standing and walking on concrete floors. The concrete floors in a dairy barn are constantly exposed to manure, urine, and cleaning water. The floors are usually slippery, hard, and bacteria-laden. Dairy cows that spend hours on concrete floors are less productive and develop health problems such as lameness, foot pain, shoulder pain, leg pain, back pain, and infections. Pain and infections decrease the cow's milk production and thus directly influence the financial success of the dairy farm. The pain caused by concrete floors also slows the cow's walking speed which increases the time for the cows to file into and out of the milking parlors. Concrete floors are also cold. Cold floors decrease blood circulation in the hoofs when cows are standing and in the udders when cows are lying on the cold floor. Reduced blood circulation in the hoof does not allow an injured hoof to heal and reduced blood circulation in the udder reduces milk production. Although the problems associated with concrete floors are known and have existed at dairy farms for decades, there have been few successful solutions despite numerous attempts.

One attempt to soften the floors has been the use of molded rubber mats that are abutted against one another and fastened to the concrete floor with anchor bolts. Drawbacks with these systems are the moisture that collects under the mats, the installation process requires fasteners that penetrate the concrete, and the system has exposed edges that cause trips. The retention of moisture allows infection-causing bacteria to thrive on and under the mats. The mats also buckle creating areas where the cows will not walk. These areas must be repaired which consumes a farmer's valuable time. Another problem is that the fasteners can injure the cow's foot. Furthermore, these mats do not stop the cow from being exposed to the bacteria that lives in the concrete.

U.S. Pat. No. 3,461,844 describes a flooring system having a poured-in-place lower layer described as a bubble-filled hard tough polymeric material. A polyurethane top coat is applied overtop of the lower layer and is described as a softer rubbery polymer. Poured-in-place systems are difficult to install in large applications such as commercial dairy barns that are frequently hundreds of feet long. In addition, prior art top coatings have been found to unacceptably degrade in the harsh environment of a diary cow barn. The art thus desires a tough, impervious flooring that is easy to install, can be used shortly after installation, and will withstand the abuse of the diary cows over time.

BRIEF SUMMARY OF THE INVENTION

The invention provides a flooring system having a pre-formed cushion layer of filler and binder that is sandwiched between sealant layers to provide a liquid-impervious flooring material.

The invention also provides a cushioned flooring system for a dairy cow barn having a base layer of concrete. A cushion layer of vulcanized crumb rubber and cured binder is connected to the concrete with a liquid-impervious sealing/adhesive layer that connects the cushion layer to the concrete while sealing the bacteria in the concrete away from the cows. A liquid-impervious top coating is applied over the cushion layer. The system may be installed in a seamless application by forming the cushion layer from a plurality of pre-formed cushioning body sections with the impervious sealant material applied over the entire combination of body sections.

The invention provides a method for installing a livestock flooring system including the steps of preparing a concrete surface which includes cleaning the concrete and optionally applying a primer. An adhesive is then applied to small sections of the concrete. Cushioning body sections are laid into the adhesive. Adjacent edges of the body sections may be interlocked. The steps are repeated over small areas until the entire target area is covered with the body sections adhesively connected to the concrete. Heavy rollers may be used to wet out the body sections against the concrete while the body sections are being laid down or after all the sections are down. An impervious sealant is then applied over the combined top surfaces of all of the body sections to seal the entire floor system.

The invention provides a system for adjusting the softness of the flooring based on the intended use of the flooring. The system and method of the invention allows additional cushioning sections to be built up on top of each other to provide different softnesses for different applications such as walkways and resting stalls.

In one embodiment, the invention provides a floor system that is designed to be installed over existing floors without extensive preparation work for the existing floor. In this embodiment, a structure support is placed over the existing floor with a cushion layer installed overtop of the support structure. The support structure may be floating or connected to the existing floor. A sealant/adhesive may be applied between the cushion layer and the support structure. A tough, impervious layer is disposed on top of the cushion layer.

The invention also provides a method of manufacturing the cushioning body sections.

BRIEF DESCRIPTION OF THE SEVERAL VIEWS OF THE DRAWINGS

Similar numbers refer to similar parts throughout the specification.

DETAILED DESCRIPTION OF THE INVENTION

Figure 1:
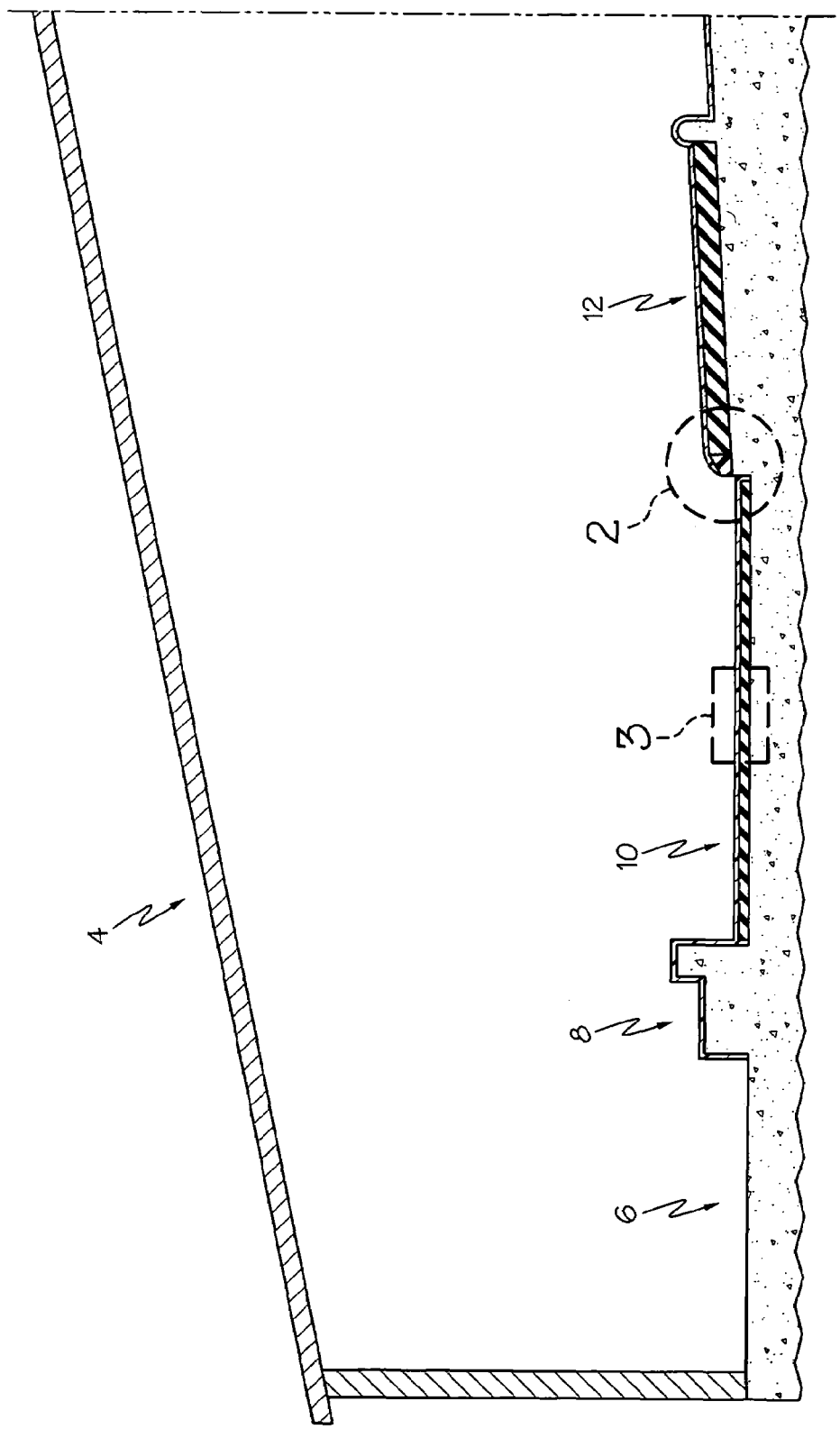
FIG. 1 is a section view of an exemplary barn application having a walkway, a resting stall, and a feed trough.

The flooring system of the present invention is indicated generally by the numeral 2 in the accompanying drawings. System 2 may be provided in different embodiments to achieve different softnesses for different locations in an installation. The exemplary application in this application is the dairy barn 4 shown in FIGS. 1 and 11. System 2 has been found to be particularly useful in dairy applications to improve the comfort, safety, and health of the dairy cows.

Dairy barn 4 generally includes a tractor hallway 6, a feed trough 8, a cow walkway 10, and a resting stall 12. In the past, the surfaces of all these were concrete 14 as described above. In the exemplary embodiment, flooring system 2 is installed at walkway 10 and resting stall 12 with feed trough 8 being coated for cleanliness and comfort. Flooring system 2 may also be installed in the milking parlors.

Flooring system 2 generally includes a cushion layer 20 and a seamless, liquid impervious upper layer 22. System 2 optionally includes a lower layer 24 that connects cushion layer 20 to concrete 14. In this application, flooring system 2 is designed based on the typical cow weight combined with the size of a typical cow hoof. The softness of flooring system 2 is varied at the different locations in the dairy operation for the comfort of the cows walking and resting on the flooring system. For example, stalls 12 are softer than walkways 10 to encourage the cows to move toward the softer surface. The different softnesses are achieved by varying the thickness and/or composition of cushion layer 20 as shown in FIGS. 2-6.

Figure 2:
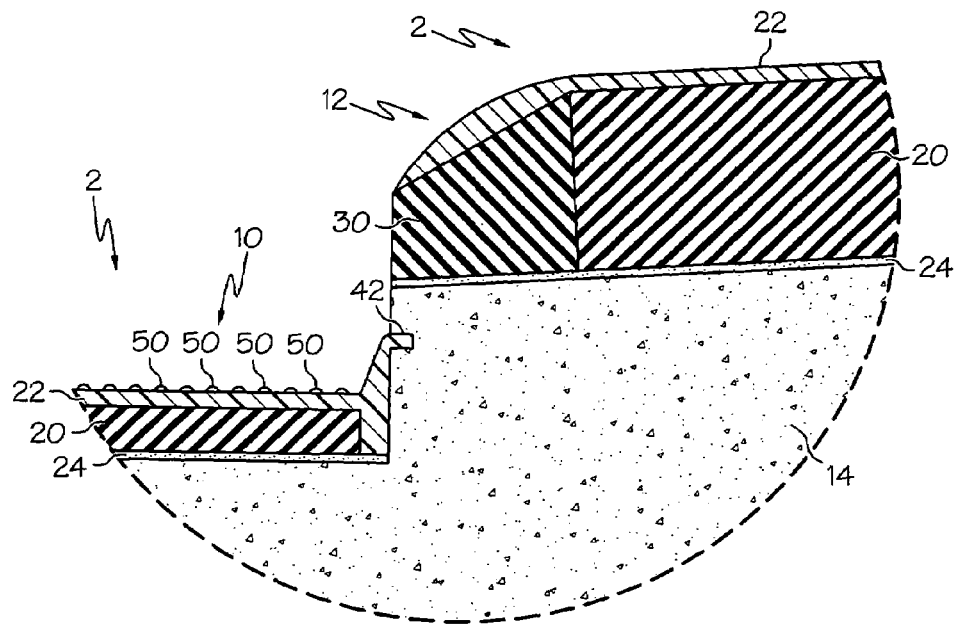
FIG. 2 is an enlarged view of the encircled portion of FIG. 1 showing the end of the flooring system at the resting stall.

FIG. 2 depicts flooring system 2 at walkway 10 and stall 12 wherein cushion layer 20 is securely connected to concrete 14 by an adhesive lower layer 24. Adhesive lower layer 24 also functions as a moisture-impervious sealant layer that prevents bacteria in concrete 14 from migrating upwardly into cushion layer 20. In some applications, concrete 14 is primed before adhesive lower layer 24 is applied. Cushion layer 20 at walkway 10 is about half the thickness of cushion layer 20 at stall 12. Cushion layer 10 is ¼ to 1 inch thick at walkway 10 and ½ to 2 inches thick at stall 12. In the exemplary embodiment, cushion layer 20 is ⅜ inch at walkway 10 and ¾ inch at stall 12.

Figure 8:
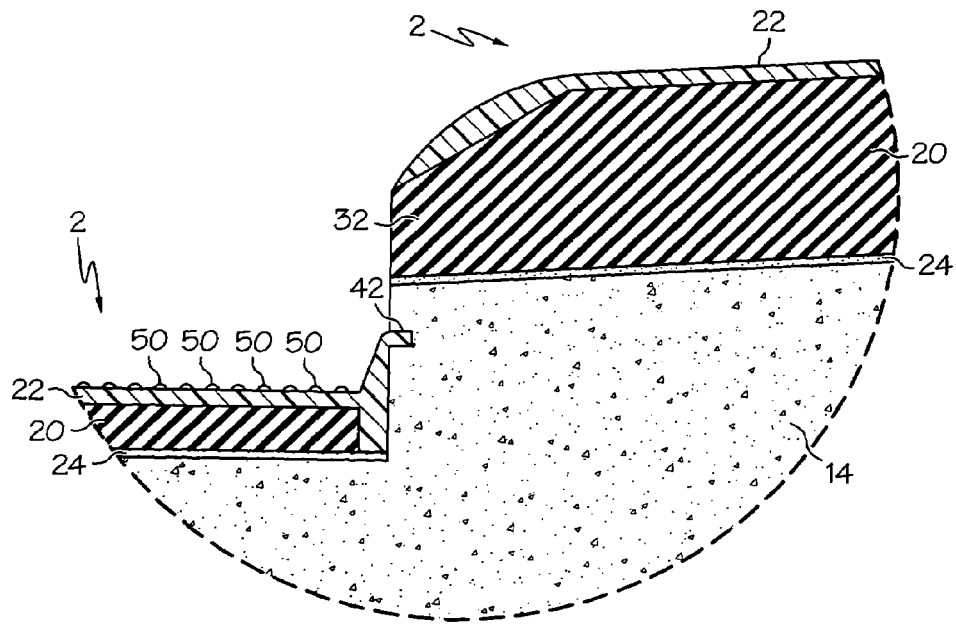
FIG. 8 is an enlarged view of the encircled portion of FIG. 1 showing an alternate embodiment of the end of the flooring system at the resting stall.
Figure 9:
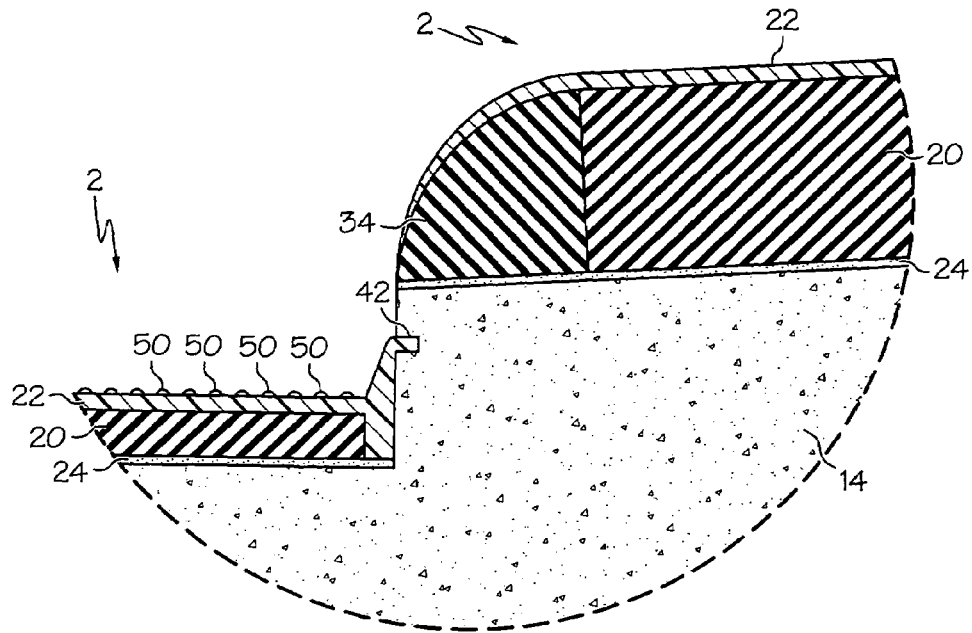
FIG. 9 is an enlarged view of the encircled portion of FIG. 1 showing an alternate embodiment of the end of the flooring system at the resting stall.
Figure 10:
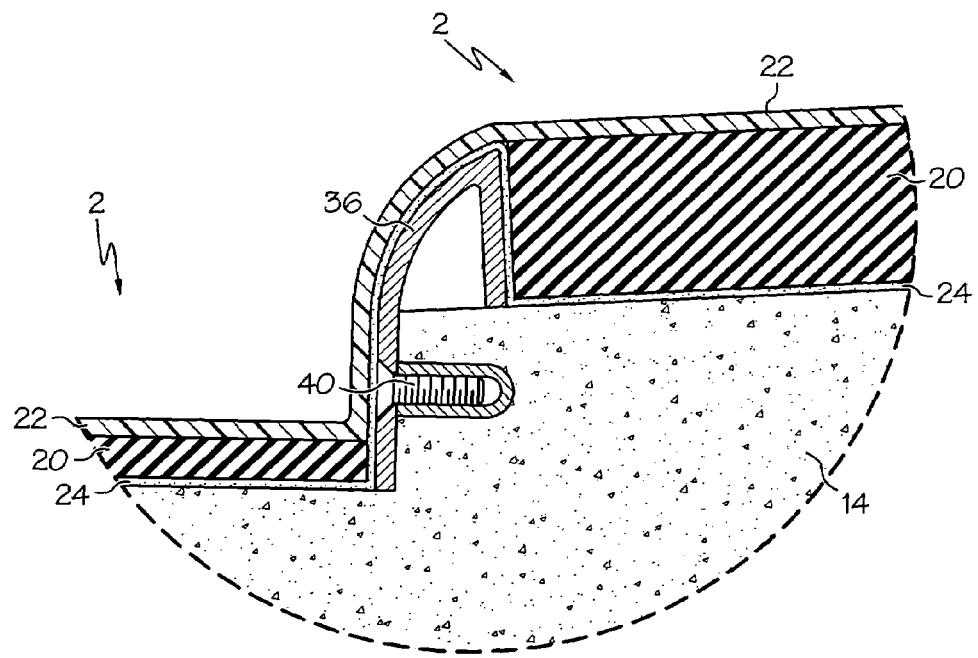
FIG. 10 is an enlarged view of the encircled portion of FIG. 1 showing an alternate embodiment of the end of the flooring system at the resting stall.
Figure 10A:
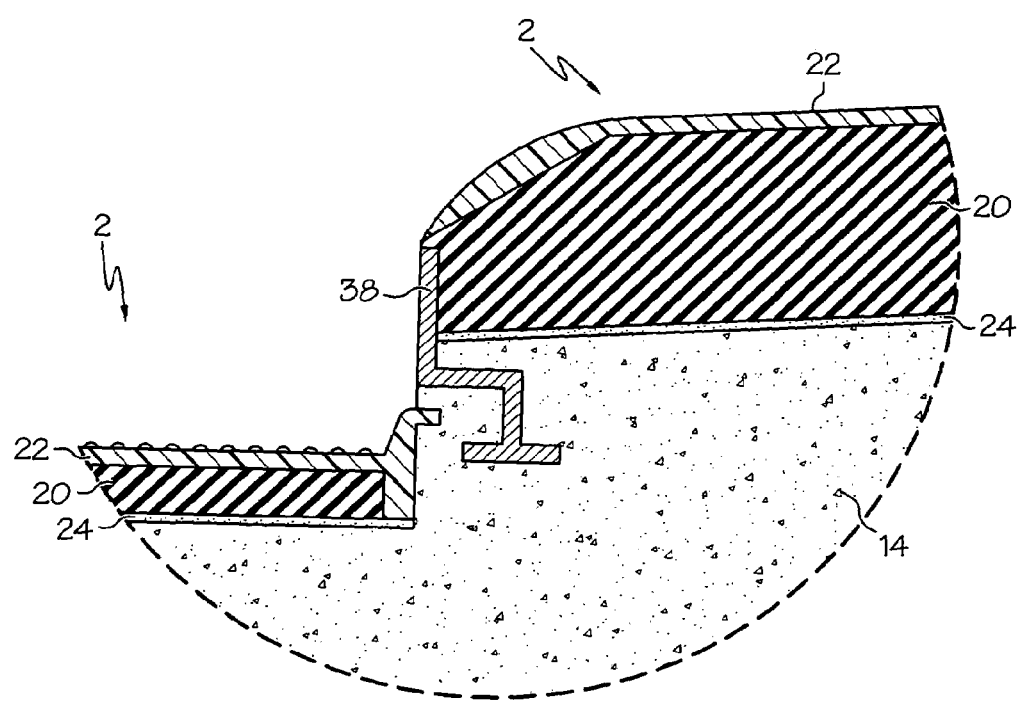
FIG. 10A is an enlarged view of the encircled portion of FIG. 1 showing an alternate embodiment of the end of the flooring system at the resting stall.

FIG. 2 shows the use of a tapered nose piece 30 disposed along the edge of the raised curb between walkway 10 and stall 12. Alternative nose pieces 32 and 34 are depicted in FIGS. 8 and 9. Nose piece 32 is integrally formed with cushion layer 20 in FIG. 8. Nose piece 34 is has a ¼ round configuration in FIG. 9. FIGS. 10 and 10A show alternative edge configurations wherein lips 36 and 38 are connected to concrete 14 to provide a structure against which cushion layer 20 abuts. In FIG. 10, lip 36 is connected to the concrete curb with a fastener 40 and includes a rounded outer surface that forms a smooth transition between walkway 10 and stall 12. Lip 38 is embedded within concrete 14.

FIG. 2 shows the position of cushion layer 20 at walkway 10 with respect to the curb between walkway 10 and stall 12. Cushion layer 20 is spaced from the vertical curb to allow the material of upper layer 22 to fill the gap to form a strong seal between the vertical surface and cushion layer 20. In the exemplary embodiment, a notch 42 is formed in the vertical concrete surface with the material of upper layer 22 disposed up the vertical surface and into notch 42.

FIG. 2 shows an anti-slip layer 50 applied at the upper surface of upper layer 22 at walkway 10. Anti-slip layer 50 may be formed in a variety of manners known to those skilled in the art such as applying an aggregate to layer 22 or applying a separate coating over the top of layer 22. In the exemplary embodiment, layer 50 is formed with the material used to form layer 22. Layer 50 is sprayed down on top of layer 22 from a larger height so that the material being sprayed starts solidifying as it falls through the air. The partially-solidified material bonds with layer 22 but does not flow to a smooth finish thus providing the anti-slip layer 50.

Figure 4:
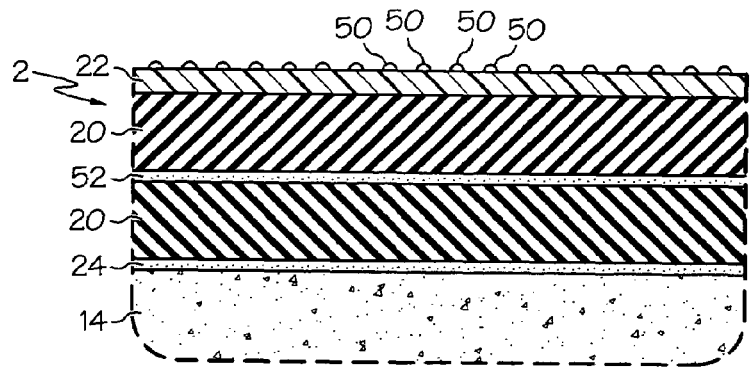
FIG. 4 is a section view of an alternative configuration wherein two cushion layers are layered to change the softness of the flooring system.
Figure 5:
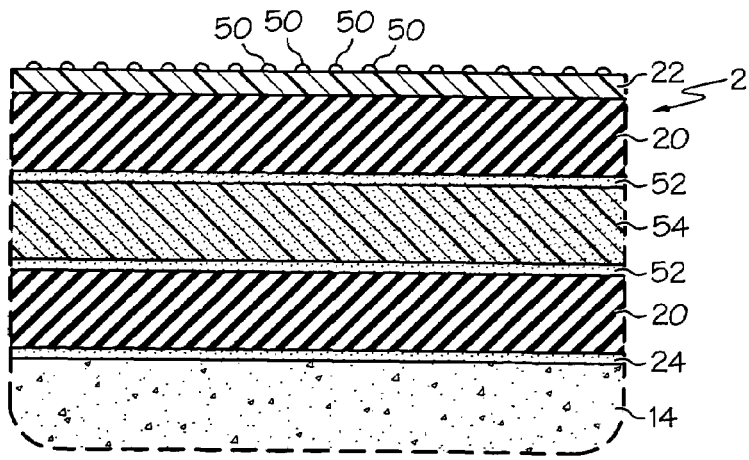
FIG. 5 is a section view of an alternative configuration wherein three cushion layers are layered to change the softness of the flooring system wherein the middle layer is a foam material.
Figure 6:
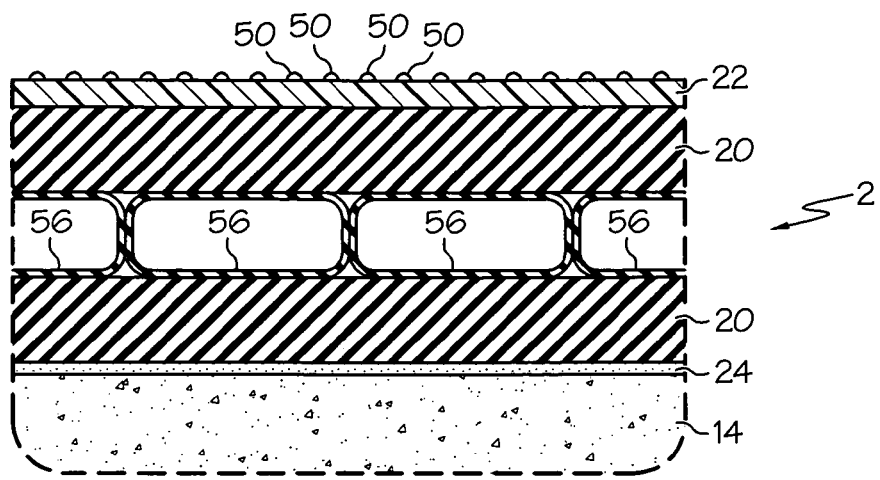
FIG. 6 is a section view of an alternative configuration wherein three cushion layers are layered to change the softness of the flooring system wherein the middle layer includes a plurality of bladders.

FIG. 4 shows the use of layered cushion layers 20 in a section of flooring system 2 to make the floor softer. A layer of adhesive 52 optionally may be used between cushion layers 20 to help hold them in place. FIG. 5 shows the use of two cushion layers sandwiching a layer of light foam material 54 to further increase the softness of system 2. FIG. 6 shows the use of a series of bladders 56 sandwiched between a pair of cushion layers 20. Bladders 56 may be filled with air, fluid, foam, or loose solids. Bladders 56 may be coated with adhesive to hold them in place. Bladders 56 may be used at rest stalls 12 to increase the softness and comfort of stalls 12 for the cows.

Figure 3:
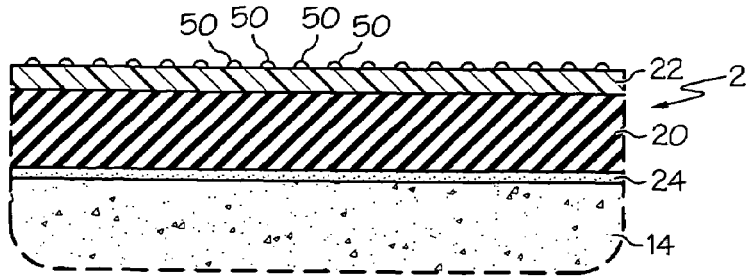
FIG. 3 is an enlarged view of the encircled portion of FIG. 1 showing the flooring system at the walkway.
Figure 7:
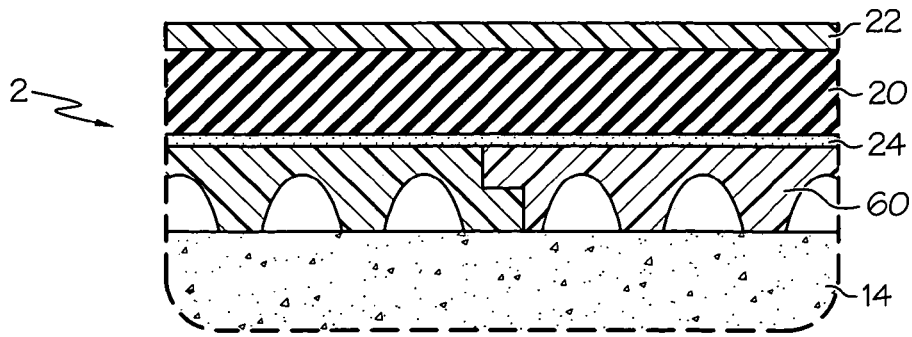
FIG. 7 is a section view of an alternative configuration that uses a lower support structure to support the cushion layer above the ground level.

An alternative embodiment of the invention is disclosed in FIG. 7. In this embodiment, old, bacteria-laden concrete 14 does not need to be treated or prepared before installing the floor system 2 of the invention. If desired, a "light" treatment may be made by smoothing the floor and filling large cracks. A support structure 60 is laid directly onto the floor 14 (which is typically concrete, but may also be dirt, sand, or limestone). This embodiment is particularly useful for areas having heavily damages concrete or non-concrete floors. Support structure 60 may be ⅜ inch to 1 inch thick. Support structure 60 is substantially rigid and strong and capable of supporting the weight of an entire animal disposed on a single hoof. Support structure 60 may be supplied in a variety of shapes and sizes. Support structure 60 may be provided in interlockable sections such as in 4 foot by 8 foot sections (4×6 foot; 4×12 foot; 4×16 foot, etc.) with interlocking edges. These sections may be cut with a saw to fit stalls, walkways, and milking parlors. Support structure 60 may be a solid, foamed, honeycombed (as shown in FIG. 3), or ribbed structure designed to support the weight of the animal using system 2. Support structure 60 may be fabricated from polycarbonate, PVC, fiberglass, or other like materials. Support structure 60 may be installed over floor 14 in a floating arrangement (as shown in FIG. 7), attached with an adhesive, or attached with mechanical fasteners. The components of floor system 2 described above are installed over the top of support structure 60. This embodiment may be used with or without layer 24 providing a lower, liquid-impervious seal. When used without layer 24, upper layer 22 prevents the bacteria from concrete 14 from contacting the animal using floor 2.

Cushion Layer 20

As described above, flooring system 2 includes at least one section of cushion layer 20. Cushion layer 20 is provided in a plurality of preformed cushioning body sections that are laid down over concrete 14 during the installation of system 2. Each cushioning body section is formed by mixing a cured thermoset material such as recycled rubber with a "binder." The "binder" can be considered a thermoset. The mixture is then formed into a desired shape that is easy to move and install by a single worker. The mixture is 50-95 percent (by weight) cured thermoset material. The percentage of cured thermoset material will vary depending on the properties desired in the cushion layer being formed. The thermoset material may be a powder (20-30 Mesh) or a crumb with an average crumb size of ¼-1/16 inches (8-12 Mesh) mixed with a binder. Various processing aids such as a blowing agent, a thixotrope (thickening agent), UV stabilizers, colored pigment, catalyst, adhesion promoters, fillers (Talc, Calcium Carbonate, Mica), reinforcing aids (textile fabric or geo-textile, fiberglass woven cloth), or a heat stabilizer may also be added to the mixture when desired. The mixture is then molded, cast or extruded and cured to form the cushioning body sections. In the exemplary embodiment, recycled rubber is provided in crumb form and is mixed with a two component thermoset (a polyurethane binder composed of an (MDI) aromatic isocyanate with an NCO value between 28-32% and a functionality between 1.9-2.4 combined with a Polyether polyol with average hydroxyl value between 50-490 and a functionality between 1-2 and molecular weight range between 1000-2000) binder to form the cushion layer. The binder reactants are a MDI isocyanate cross-linked with a medium to low molecular weight polyol/ or polyols, blended as a prepolymer. In addition, other short chain diols/triols may be used with additives for color, stability, processability, and physical property enhancements. Each cushioning body section has a width of 1 to 6 feet with a thickness in the range of ¼ inch to 2 inches. The Shore A hardness of the extrusion is between 35 and 70. The length of each section may be custom made for a desired installation to speed the installation process. For example, if each rest stall 12 is 6½ feet in length, the body sections may be formed in 6½ foot lengths (depending on the type of nose 30 being used) to minimize joints in cushion layer 20. The edges of the cushioning body sections may be formed with any of the edge profiles shown in FIG. 13 to allow for abutting or interlocking body sections. Customizing the length of the sections is particularly easy to accomplish in the first method described below.

Thermoset materials useful in the present invention include any thermoset that when processed according to the present invention will yield a product having the desired properties. Mixtures of thermosets may be used. Generally, the thermoset utilized in the present invention includes at least one selected from the group consisting of rubber, phenolics, alkyds, amino resins, polyesters, epoxides and silicones. Preferably, the thermoset utilized in the present invention is rubber or recycled rubber. "Rubber" as used herein is intended to mean one or more of the following: natural rubber, polymers, interpolymers and copolymers of conjugated diolefins, i.e., polybutadiene, butadiene-styrene copolymers, butadiene-acrylonitrile copolymers, polymers and copolymers of methylpentadiene; polymeric forms of chlorine substitution products of conjugated diolefins, i.e., polychloroprene; polymers of non-conjugated systems, i.e., polyisobutylene, silicone, polyurethane, and waste rubber from tires. The thermosets utilized in the present invention may be obtained from any source, including being produced in-situ in the process. However, it is generally economically desirable that the thermosets utilized in the present invention be obtained as scrap or waste material such as from discarded tire or scrap from manufacturing processes. Tires that may be used include passenger, truck, off-the-road, motorcycle, aircraft, and bicycle. Tire cord materials may remain in the tire material or may be removed from the tire material that is used to form the cushion layer.

Figure 14:
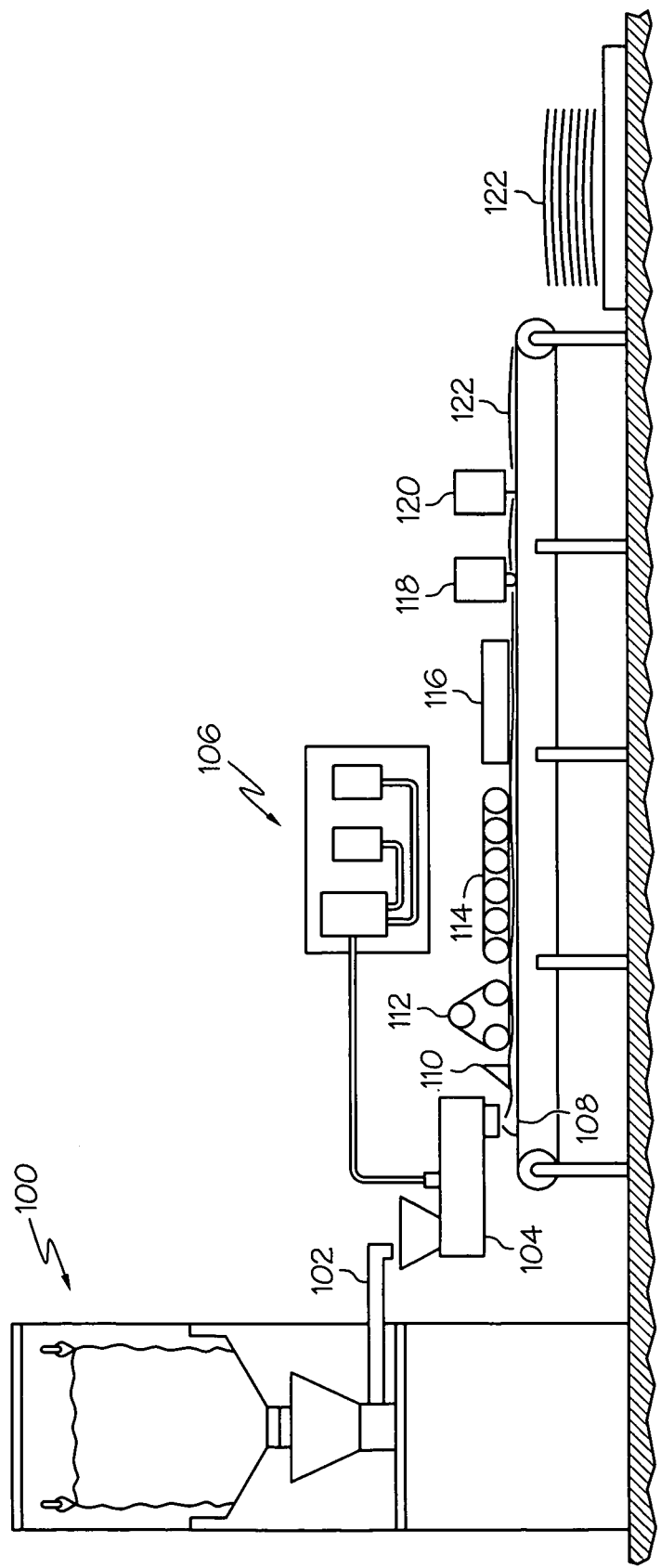
FIG. 14 is a schematic view of a first embodiment of a manufacturing line used to fabricate the mats used to form the cushion layer.
Figure 15:
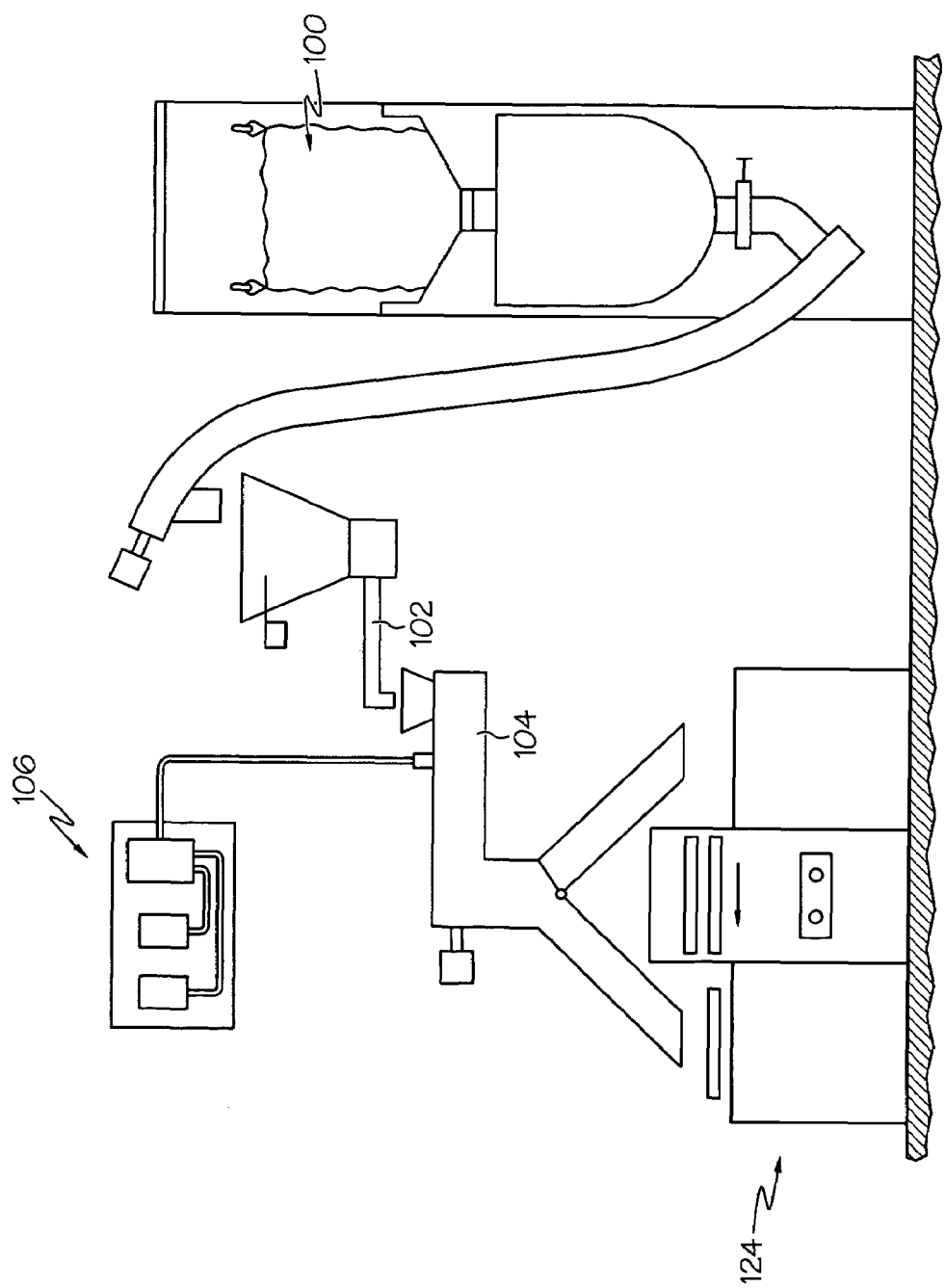
FIG. 15 is a schematic view of a second embodiment of a manufacturing line used to fabricate the mats used to form the cushion layer.

The cushioning body sections may be formed from either of the exemplary methods shown schematically in FIGS. 14 and 15. In FIG. 14, bulk material such as crumb rubber is provided in large bales or bags at location 100. This material is emptied in a volumetric conveyor 102 that delivers the crumb rubber to a mixer 104. The binder material is supplied from an appropriate supply system 106 injected into mixer 104. The mixed material is poured onto a moving conveyor 108 where it passes under a first rough knife 110 to set a first height. A first pressure roller or conveyor 112 is used to push down on the cast material and form a section having a second height. A second pressure roller or conveyor 114 is used to sandwich the cushioning body section and apply constant pressure until the material cures or sets up sufficiently to maintain its physical dimensions. Thus, knife 110 and conveyors 112/114 set the final thickness of sections 122. A heater 116 may be used to complete the cure if needed. A width knife 118 is used to trim the rough edges and set the width of the cushioning body sections. A length knife 120 is used to cut the continuous strip of material to form individual cushioning body sections 122. This method allows a large number of uniform sections 122 to be formed quickly without excess manpower.

FIG. 15 schematically depicts an alternative manufacturing line uses an alternating mold 124 used to mold sections 122. Mixed material is alternately delivered to first and second molds that are pressed and heated to form sections 122.

Upper Layer 22

The liquid-impervious upper layer 22 is polyurethane, polyurea, or a hybrid urethane/urea coating. In dairy cow and other animal applications, the upper, liquid-impervious layer must be tough enough to with stand the sharp hooves of heavy animals. The inventors have found that polyurea is able to withstand the environment of a dairy barn. Exemplary commercial products include DM50, DM45, and NS45 from VersaFlex Incorporated, of Riverside, California and other products with similar properties. A particularly successful product is VersaFlex 45DC.

Lower Layer 24

Lower layer 24 is a two component urethane (room temperature/low pressure applied) elastomeric adhesive. This is generally a reaction product of an aromatic MDI (Methylene Diphenyl Dilsocyanate) based "prepolymer" containing the functional group—NCO. This is crosslinked with a chain extender to a medium molecular weight Polyol (either a monomer with more than one hydroxyl (OH) per molecule{e.g., butanediol, glycerol, sucrose} or a polymeric diol, triol, etc., such as polyether glycol, castor oil). Lower layer 24 may also be a polyurea adhesive type is derived from the reaction product of an isocyanate (in this case MDI) and a resin "blend" component. The resin blend must be made up of amine-terminated polymer resins, and/or amine terminated chain extenders. The "soft-segment" of the polyurea polymer is formed by multi-functional, high molecular weight amine-terminated polyether polyglols, whereas lower molecular weight aromatic diamine chain extenders, are responsible for the hard segment. The amine-terminated resins will not have any intentional hydroxyl moieties.

In some applications, concrete 14 is primed before the adhesive/sealant 24 is applied. The primer may be an aromatic (MDI) based pre-polymer, AA Grade castor oil and specialty additives such as defoamers, biocides, adhesion promoters, flow and leveling agents and surfactants and the like. The primer may be used to act as a penetrating coating that permeates well into the surface of the concrete. As the primer coat cures, it can function as a polymer/substrate matrix that can substantially increase the surface strength of the concrete, leading to increased over-all bond strength. Additionally, the reactants of the primer can potentially react with the reactants of the adhesive thus forming strong covalent bonding.

Method for Installing System 2

Once the parameters of the flooring system are designed, the installer may install the flooring system by following these steps. As an initial step, the designer determines the thicknesses of the cushion layers 20 to be used at the different locations in the application. The designer also determines the lengths of the cushioning body sections that are to be used to minimize joints and installation time. For example, if walkway 10 is twelve feet wide, the designer will want to build cushioning body sections in 11' 11½" lengths or pairs of 5' 11¾" lengths (the difference providing the gaps shown in FIG. 2).

When adhering the cushion layers directly to the concrete floor or to a primed concrete floor, the installer cleans and dries the concrete floor. With new concrete, the moisture in the concrete should be less than 6 percent. The cleaning may be achieved by pressure washing or other appropriate standardized cleaning and preparation methods. The top surface of the concrete may need to be roughened if needed. The primer may then be applied to the concrete.

Figure 11:
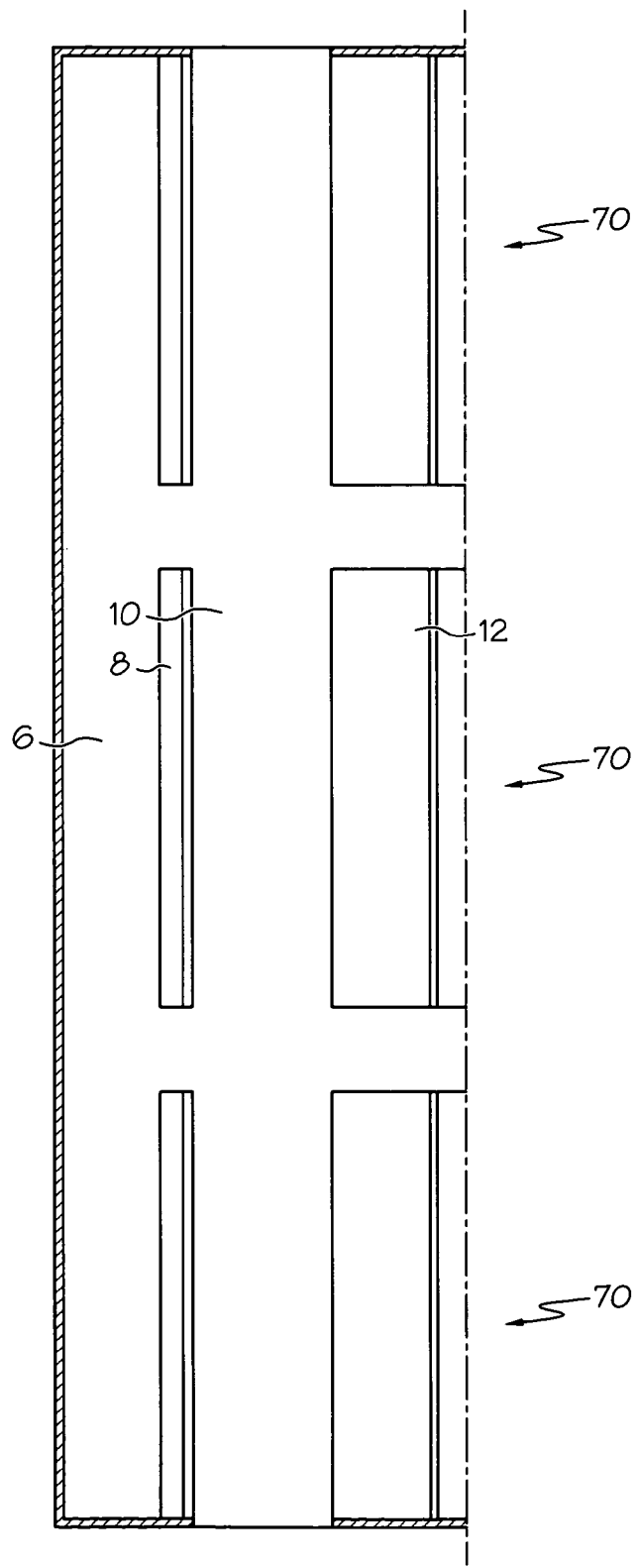
FIG. 11 is a top plan view of the barn floor of FIG. 1 wherein three stall areas are arranged in an end-to-end configuration.
Figure 12:
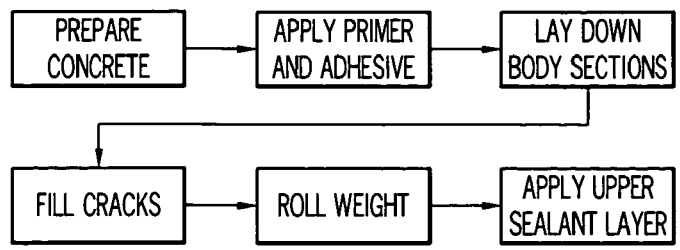
FIG. 12 is a flow chart showing one set of steps used to install the flooring system of the invention.
Figure 13A:
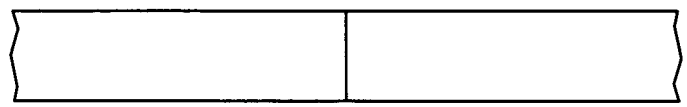
FIGS. 13A, 13B, 13C, and 13D are schematic views showing exemplary edge configurations for the cushion layers.
Figure 13B:
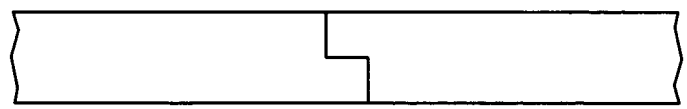
Figure 13C:
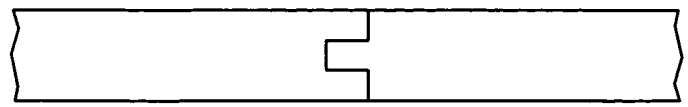
Figure 13D:

System 2 of the invention has been found to be useful in large dairy barns such as those that are over 1200 feet long as shown in FIG. 11. The barn shown in FIG. 11 has three stall areas 70 disposed end-to-end. An active dairy farm cannot close a barn of this size for long periods of time in order to install a replacement floor. The installation method must take the limited time into account so that the cows may be brought back into the barn after a short time.

After the concrete is prepared and primed (if necessary), the installers assemble enough adhesive and cushioning body sections to form all of the cushion layers 20 needed for the entire barn. The installers then start at one end of a stall area 70 and apply the lower layer 24 adhesive to an area just larger than a single cushioning body section. An installer then positions one cushioning body section on the adhesive and aligns it with the appropriate edges and curbs as described above. The next area of adhesive is applied and the process is repeated with the edges of adjacent body sections being abutted, overlapped, or interlocked as shown in FIG. 13. This system allows large barn floors to be installed by a small installation crew in a short time. Each cushioning body section is small enough to be installed by one or two installers. The method and system also does not required excessive site preparation such as temporary edge boundaries used to hold a poured-in-place system in place until it cures. The system and method is also easy to install on the sloped stall areas. Any of the cushion layer configurations described above may be used. Cracks between body sections may be filled with a filler. Weight is then rolled over the body sections to wet out the adhesive. All of the target areas (stall areas 70 in the exemplary embodiment) are covered with cushion layer before layer 22 is applied.

The impervious upper surface 22 is applied after all the cushioning body sections layers are in place so that the upper surface is continuous across adjacent cushion layers and the floor sections that do not have the cushion layers. Layer 22 is sprayed on using appropriate sprayers and application processes. The non-slip coating may be applied during or after the application of layer 22. Once installed, the impervious surface may be cleaned and scraped without damaging the layer. The surface may also be reconditioned after time has passed without replacing the cushion layers.

In the case of feed trough 6 or feed bunks 6, a single layer of polyurea may be applied as shown in FIG. 1 to provide a smooth, cleanable eating surface for the cows. The polyurea-coated trough 6 prevents bacteria in concrete 14 from contaminating the food in trough 6 and the tongues of the cows. The smoothness of the coating does not irritate the cow's tongues and the cow's are more likely to eat a healthy diet. The coated troughs can be cleaned and disinfected between feeds.

Other exemplary applications for flooring system 2 include zoo pens, horse stalls, kennels, and animal trailers. Another embodiment may use cushion layer 20 and upper layer 22 as a stand-alone floor mat for a variety of reasons such as an anti-fatigue mat for human workers. In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

The invention claimed is:

1. A method of installing a flooring system chiefly used by animals, the method including the steps of:
    preparing a sub-surface wherein a curb is disposed between a walkway and a stall;
    notching the curb to define a notch;
    identifying portions of the subsurface that are used as the walkway and the stall;
    connecting a plurality of individual cushioning body sections to the sub-surface with an adhesive to form a cushion layer;
    configuring the cushion layer to be softer over the stall than the walkway;
    positioning an individual cushioning body section having a tapered nose piece with the tapered nose piece adjacent the curb; and
    covering the cushion layer with a liquid-impervious layer and filling the notch with the material of the liquid-impervious layer to define a continuous liquid-impervious layer between the curb and the walkway.

2. The method of claim 1, further comprising the step of connecting the individual cushioning body sections to the sub-surface with an adhesive such that substantially all of the lower surface of the individual cushioning body sections adhered to the sub-surface.

3. The method of claim 1, further comprising the step of layering a plurality of individual cushioning body sections before covering the cushion layer with the liquid-impervious layer.

4. The method of claim 1, wherein the step of connecting a plurality of individual cushioning body sections includes the steps of connecting a first individual cushioning body section to the sub-surface and connecting a second individual cushioning body section to the sub-surface adjacent the first individual cushioning body section.

5. The method of claim 4, wherein the first and second individual cushioning body sections have edges and further comprising the step of overlapping the edges of the adjacent first and second individual cushioning body sections.

6. The method of claim 1, further comprising the step of applying only enough adhesive to the sub-surface to connect a single individual cushioning body section before the single individual cushioning body section is laid down.

7. The method of claim 1, further comprising the step of stacking a plurality of individual cushioning body sections over one another to define the cushion layer before covering the cushion layer with the liquid-impervious layer.

8. The method of claim 7, further comprising the step of applying an adhesive between the individual cushioning body sections.

9. The method of claim 7, further comprising the step of using twice as many layers of individual cushioning body sections in the stalls as the walkways.

10. A method of installing a flooring system chiefly used by animals, the method including the steps of:
    preparing a sub-surface having at least a plurality of stalls disposed adjacent a walkway with a curb disposed between the stalls and walkway;
    connecting a plurality of individual cushioning body sections to the sub-surface with an adhesive to form a cushion layer;
    layering individual cushioning body sections in the stalls so that the cushion layer in the stalls are softer than the cushion layer in the walkway;
    notching the curb;
    covering the cushion layer in the walkway and the stalls with a liquid-impervious layer; and
    filling the notch with the material of the liquid-impervious layer.

11. The method of claim 10, further comprising the step of connecting the individual cushioning body sections to the sub-surface with an adhesive such that substantially all of the lower surface of the individual cushioning body sections adhered to the sub-surface.

12. The method of claim 11, further comprising the step of positioning an individual cushioning body section having a tapered nose piece with the tapered nose piece adjacent the curb.

13. The method of claim 11, further comprising the step rolling a weight over the individual cushioning body sections to wet out the adhesive.

14. The method of claim 10, further comprising the step of positioning the individual cushioning body sections in the walkway to define a gap between the individual cushioning body sections and the curb.

15. The method of claim 14, further comprising the step of filling the gap with the material of the liquid-impervious layer.

16. The method of claim 10, further comprising the step of priming the sub-surface.

17. The method of claim 10, further comprising the step of filling any seams between adjacent individual cushioning body sections before the step of covering the cushion layer in the walkway and the stalls with a liquid-impervious layer.

* * * * *